US008760805B2

(12) United States Patent
Watanabe et al.

(10) Patent No.: US 8,760,805 B2
(45) Date of Patent: Jun. 24, 2014

(54) THIN FILM MAGNETIC HEAD, THIN FILM MAGNETIC HEAD DEVICE, AND MAGNETIC RECORDING/REPRODUCING APPARATUS

(75) Inventors: Hisayoshi Watanabe, Tokyo (JP); Hitoshi Hatate, Tokyo (JP); Hideyuki Yatsu, Tokyo (JP); Koichi Otani, Tokyo (JP)

(73) Assignee: TDK Corporation, Tokyo (JP)

( * ) Notice: Subject to any disclaimer, the term of this patent is extended or adjusted under 35 U.S.C. 154(b) by 181 days.

(21) Appl. No.: 13/176,134

(22) Filed: Jul. 5, 2011

(65) Prior Publication Data
US 2013/0010390 A1   Jan. 10, 2013

(51) Int. Cl.
G11B 5/127   (2006.01)
(52) U.S. Cl.
USPC ................ 360/125.13; 360/125.14
(58) Field of Classification Search
USPC ............. 360/125.14, 125.13, 125.52, 125.51, 360/125.65, 125.64
See application file for complete search history.

(56) References Cited

U.S. PATENT DOCUMENTS

| | | | | |
|---|---|---|---|---|
| 5,801,910 A * | 9/1998 | Mallary | .................... | 360/125.65 |
| 6,369,984 B1 * | 4/2002 | Sato | .......................... | 360/125.43 |
| 6,525,904 B1 * | 2/2003 | Sasaki | ...................... | 360/125.65 |
| 6,538,845 B1 * | 3/2003 | Watanabe et al. | ........ | 360/125.43 |
| 6,697,221 B2 * | 2/2004 | Sato et al. | ................. | 360/125.13 |
| 7,061,717 B2 * | 6/2006 | Takano | .................... | 360/125.65 |
| 7,558,020 B2 * | 7/2009 | Sasaki et al. | ............. | 360/125.14 |
| 7,656,612 B2 * | 2/2010 | Sasaki et al. | ............. | 360/125.14 |
| 8,182,704 B2 * | 5/2012 | Sasaki et al. | ..................... | 216/22 |
| 8,270,109 B2 * | 9/2012 | Ohtsu | ....................... | 360/125.03 |
| 2003/0151850 A1 * | 8/2003 | Nakamura et al. | ............ | 360/125 |
| 2011/0090595 A1 | 4/2011 | Hirata et al. | | |

FOREIGN PATENT DOCUMENTS

JP    2007-257815    10/2007

OTHER PUBLICATIONS

U.S. Appl. No. 13/289,369, filed Nov. 4, 2011, Hatate, et al.
U.S. Appl. No. 12/845,349, filed Jul. 28, 2010, Hirata, et al.

* cited by examiner

*Primary Examiner* — Julie Anne Watko
(74) *Attorney, Agent, or Firm* — Oblon, Spivak, McClelland, Maier & Neustadt, L.L.P.

(57) ABSTRACT

A thin-film magnetic head includes a slider substrate and a write element. The slider substrate has an air bearing surface at one side thereof. The write element has a recording magnetic pole film. The recording magnetic pole film is disposed on a plane crossing the air bearing surface over the slider substrate and has a large-width portion and a small-width portion continuously arranged in the named order toward the air bearing surface. The small-width portion has a smaller width than the large-width portion. Of the large-width portion and the small-width portion, at least the small-width portion has a first portion and a second portion. The second portion is continuous with an upper end of the first portion and has both side faces inclined in such a direction as to increase the width. An external angle of the first portion formed by a plane parallel to a bottom face and the side face is larger than an external angle of the second portion formed by a plane parallel to the bottom face and the side face.

10 Claims, 23 Drawing Sheets

Prior Art FIG.3

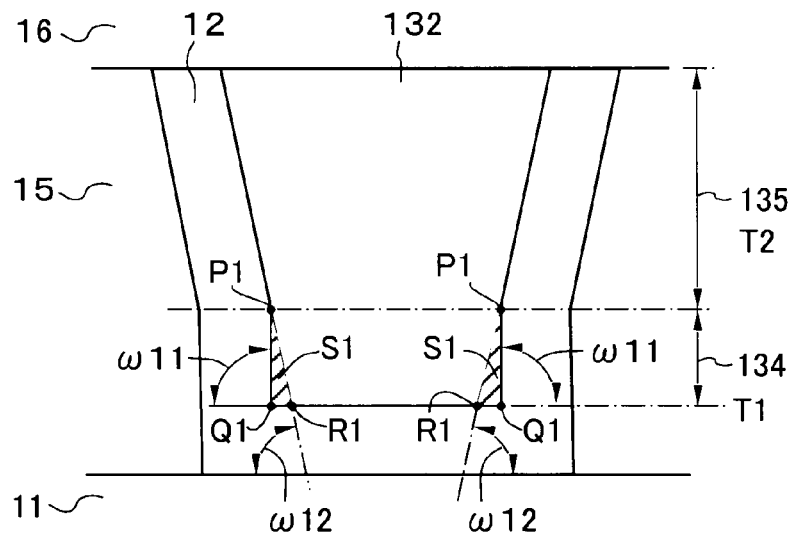
FIG.5
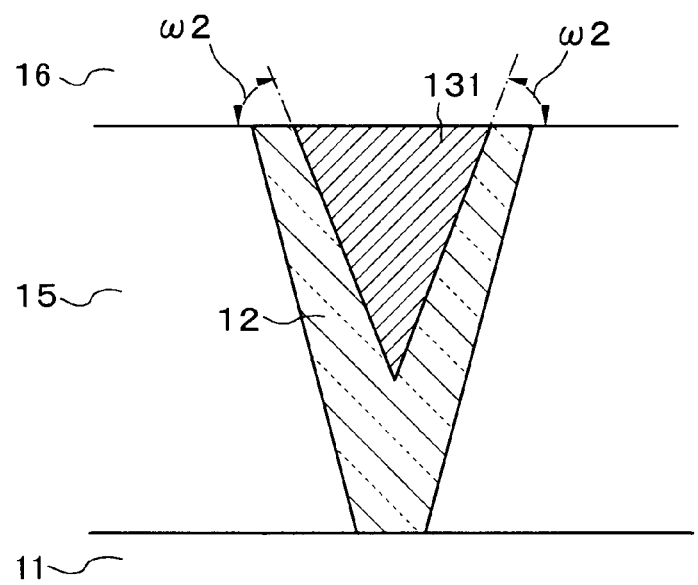
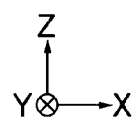
FIG.6

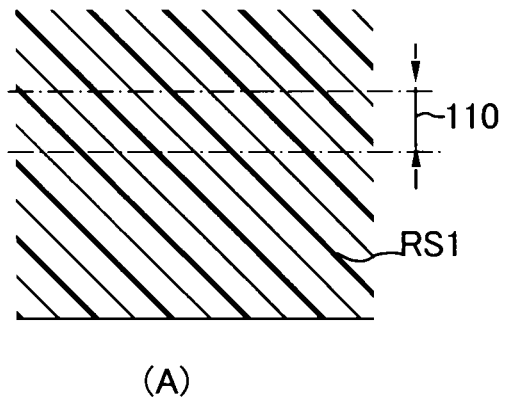
(A)
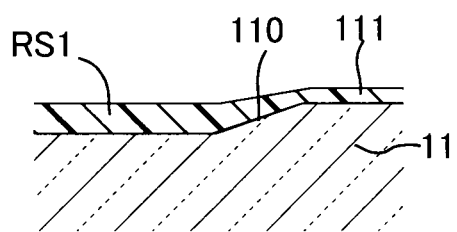
(B)
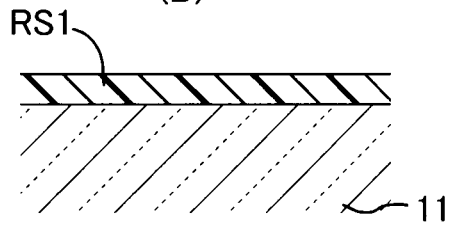
(C)
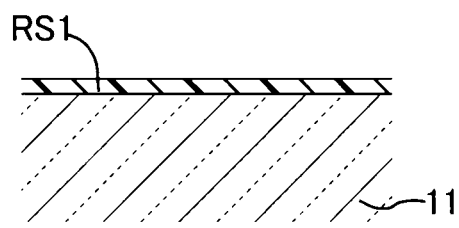
(D)
FIG.8

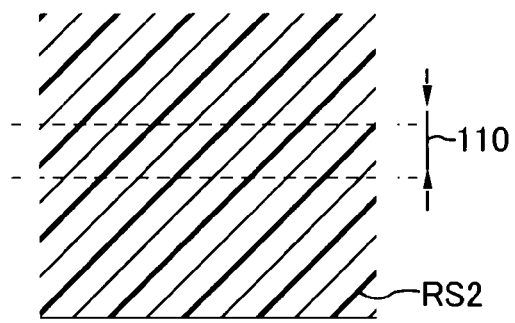
(A)
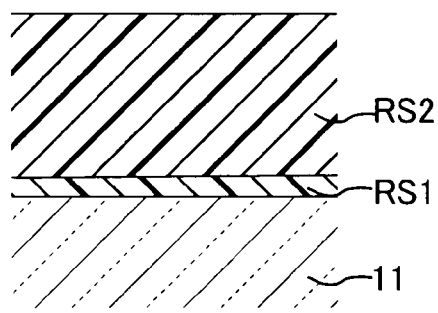
(B)
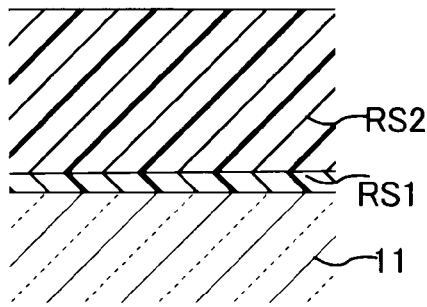
(C)
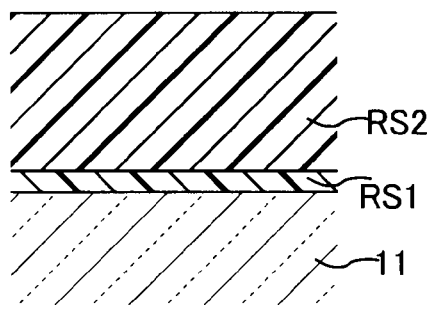
(D)
FIG.9

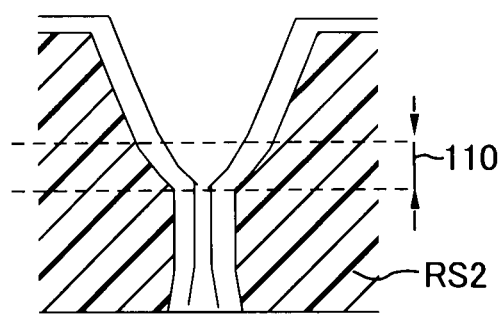
(A)
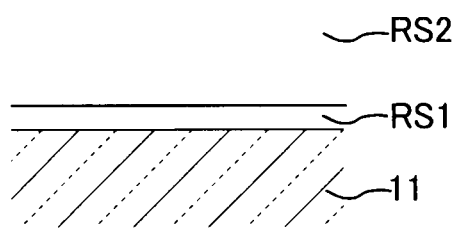
(B)
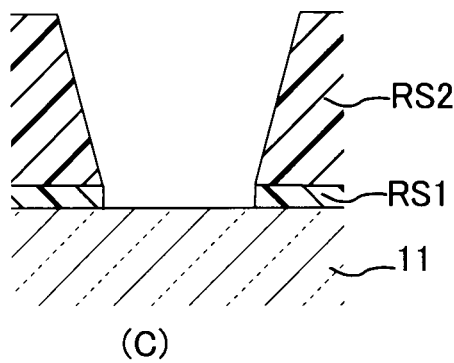
(C)
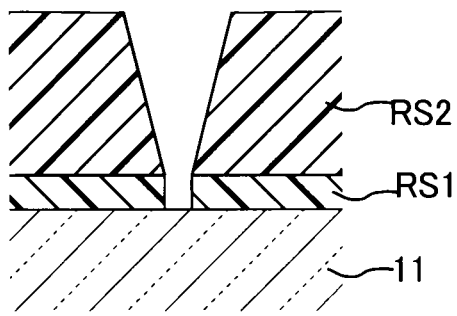
(D)
FIG.10

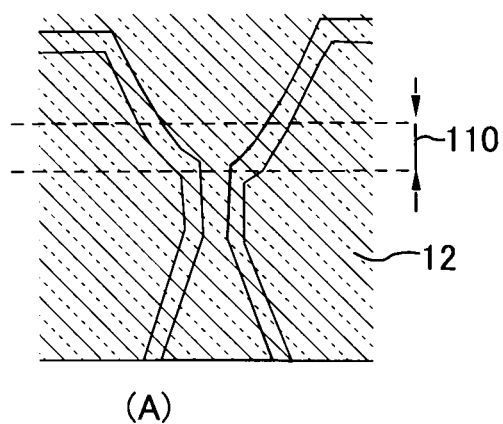
(A)
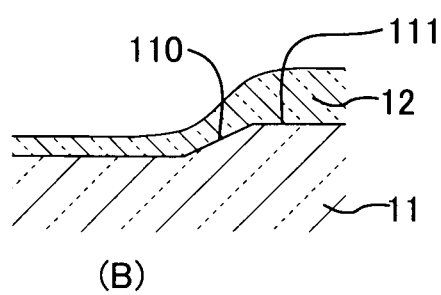
(B)
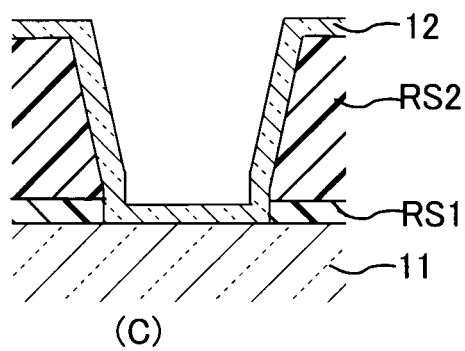
(C)
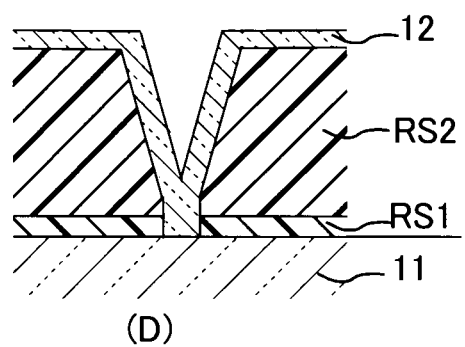
(D)
FIG.11

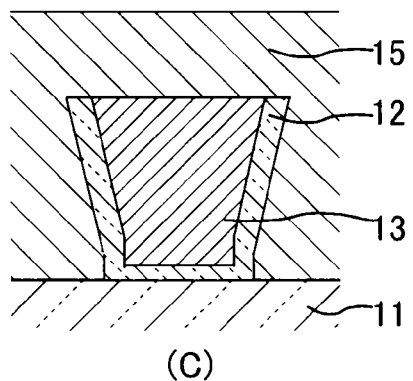
(C)
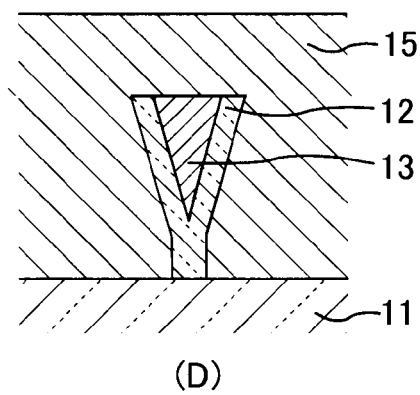
(D)
FIG.15
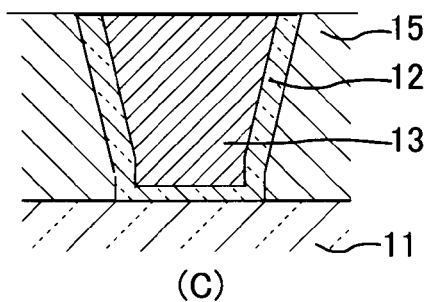
(C)
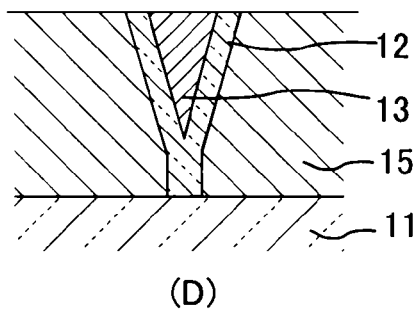
(D)
FIG.16

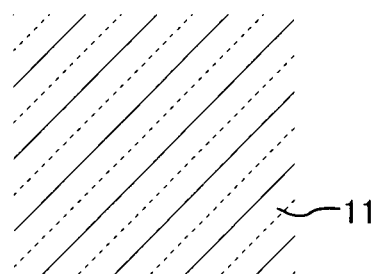
(A)
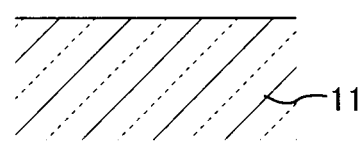
(B)
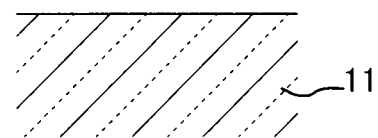
(C)
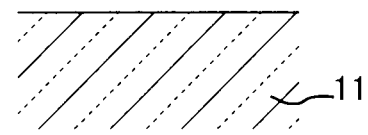
(D)
FIG.17

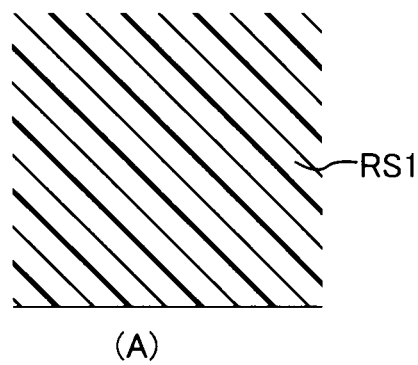
(A)
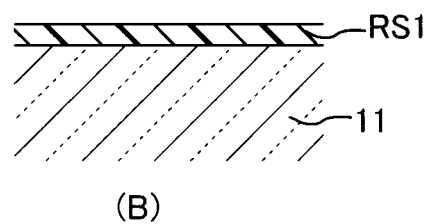
(B)
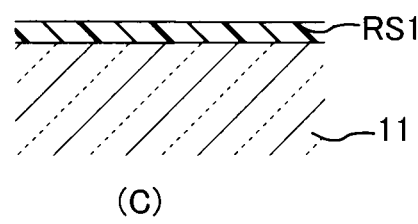
(C)
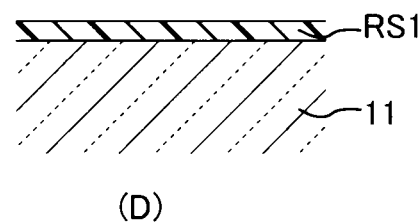
(D)
FIG.18

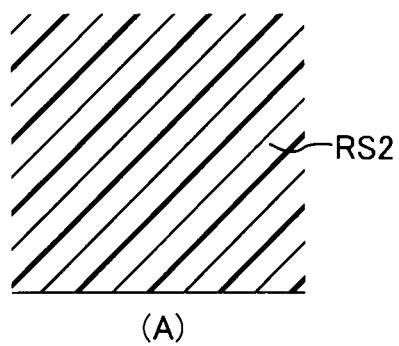
(A)
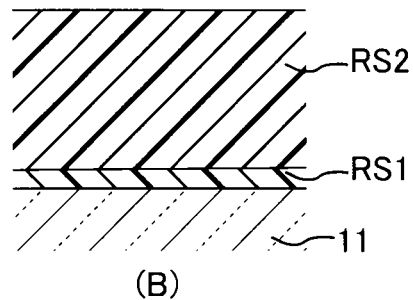
(B)
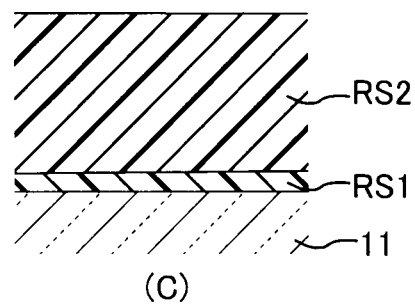
(C)
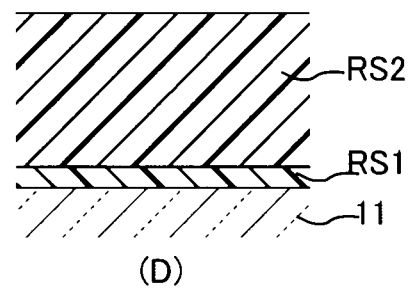
(D)
FIG.19

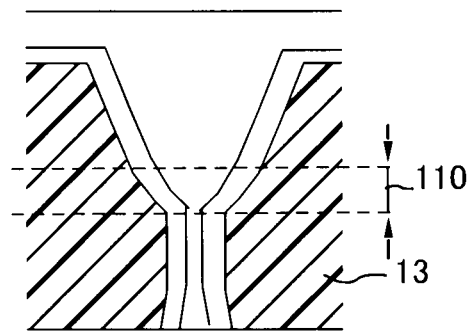
(A)
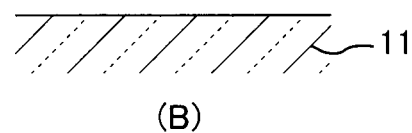
(B)
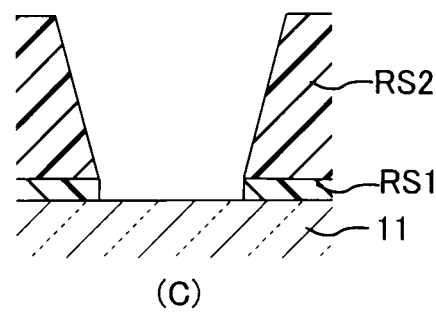
(C)
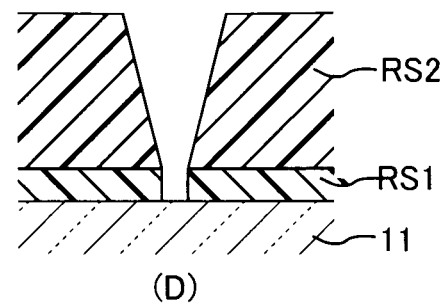
(D)
FIG.20

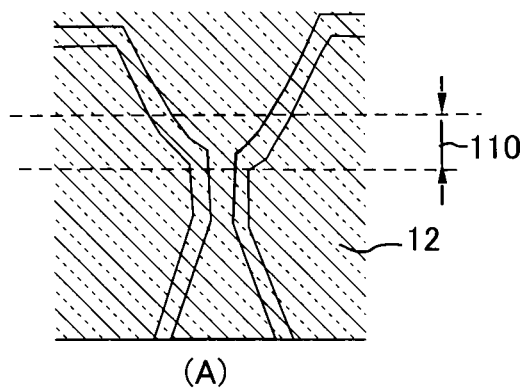
(A)
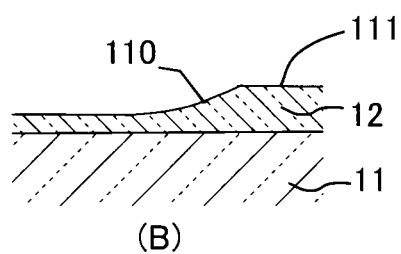
(B)
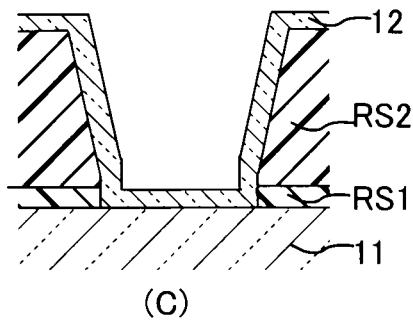
(C)
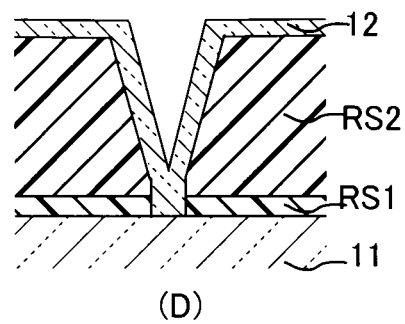
(D)
FIG.21

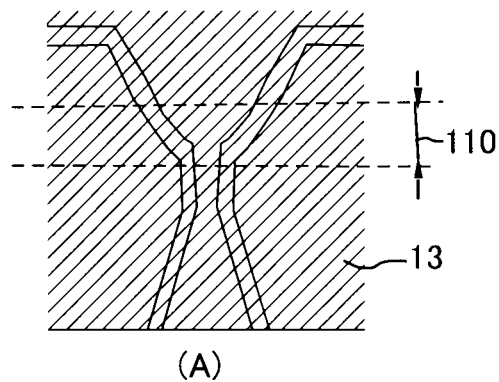
(A)
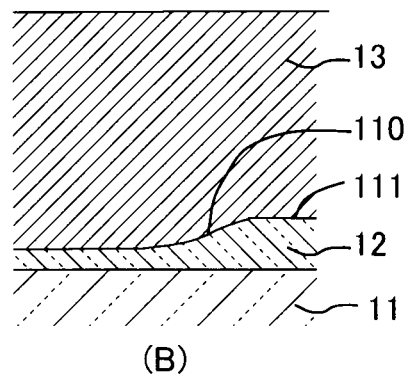
(B)
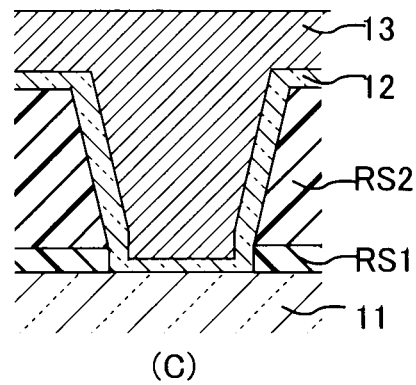
(C)
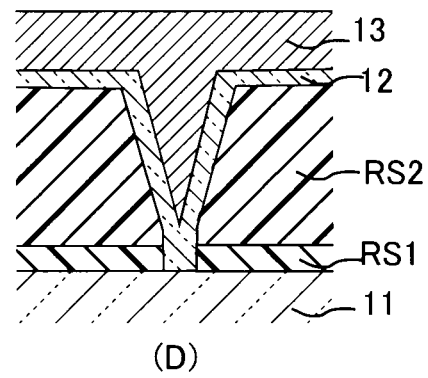
(D)
FIG.22

THIN FILM MAGNETIC HEAD, THIN FILM MAGNETIC HEAD DEVICE, AND MAGNETIC RECORDING/REPRODUCING APPARATUS

TECHNICAL FIELD

The present invention relates to a thin-film magnetic head, a thin-film magnetic head device, a magnetic recording/reproducing apparatus and a method for manufacturing the thin-film magnetic head.

BACKGROUND OF THE INVENTION

In thin-film magnetic heads, as disclosed in Japanese Unexamined Patent Application Publication No. 2007-257815, for example, an end face of a main magnetic pole film (recording magnetic pole film) appearing at an air bearing surface (ABS) is shaped to have a bevel angle so as to prevent so-called "side-erasing", i.e., overwriting of adjacent tracks. The bevel angle is set such that the end face of the main magnetic pole film has a larger width at a trailing side. Conversely, it must have an inverted triangular shape or an inverted trapezoidal shape having a smaller width at a leading side. However, this reduces a sectional area of the main magnetic pole to degrade writing performance.

Moreover, since the main magnetic pole of the thin-film magnetic head has a large-width portion and a small-width portion in such an arrangement as to send a magnetic flux from the large-width portion to the small-width portion, the magnetic flux from the large-width portion concentrates on the small-width portion. This easily causes magnetic saturation or magnetic flux leakage at the small-width portion, hindering improvement in writing performance.

SUMMARY OF THE INVENTION

It is an object of the present invention to provide a thin-film magnetic head, a thin-film magnetic head device and a magnetic recording/reproducing apparatus in which magnetic saturation and unnecessary magnetic flux leakage are suppressed to improve writing performance while preventing side-erasing.

It is another object of the present invention to provide a manufacturing method suitable for manufacturing the thin-film magnetic head.

In order to achieve the above object, a thin-film magnetic head according to the present invention comprises a slider substrate and a write element. The slider substrate has an air bearing surface at one side thereof. The write element has a recording magnetic pole film and is disposed at the slider substrate. The recording magnetic pole film is disposed on a plane crossing the air bearing surface and has a large-width portion and a small-width portion continuously arranged in the named order toward the air bearing surface.

The small-width portion has a smaller width than the large-width portion, and of the large-width portion and the small-width portion, at least the small-width portion has a first portion and a second portion. The first portion extends upward from a bottom face, while the second portion is continuous with an upper end of the first portion and has both side faces inclined in such a direction as to increase the width. An external angle of the first portion formed by a plane parallel to the bottom face and the side face is larger than an external angle of the second portion formed by a plane parallel to the bottom face and the side face.

In the thin-film magnetic head according to the present invention, as described above, the recording magnetic pole film has a large-width portion and a small-width portion continuously arranged in the named order toward the air bearing surface, and the small-width portion has a smaller width than the large-width portion. With this structure, a magnetic flux can be efficiently supplied from the large-width portion to the small-width portion which will serve as a recording magnetic pole.

Of the large-width portion and the small-width portion, at least the small-width portion has a first portion and a second portion, wherein the first portion extends upward from a bottom face, while the second portion is continuous with an upper end of the first portion and has both side faces inclined in such a direction as to increase the width along a height direction (film thickness direction). That is, an end face of the main magnetic pole film (recording magnetic pole) appearing at the air bearing surface (ABS) is shaped to have a bevel angle BA. This makes it possible to prevent so-called "side-erasing", i.e., overwriting of adjacent tracks.

Moreover, an external angle of the first portion formed by a plane parallel to the bottom face and the side face is larger than that of the second portion. This results in increasing the sectional area of the first portion as compared with the prior art in which both side faces extend to the bottom face at a constant external angle (bevel angle BA), so that writing performance can be improved not only by reducing leakage of a magnetic flux supplied from the large-width portion to the small-width portion but also by avoiding magnetic saturation at the small-width portion. The external angle of the first portion formed by a plane parallel to the bottom face and the side face is typically an angle at which the first portion extends upward with a constant width, i.e., 90 degrees.

In general, the width of the small-width portion gradually decreases along a length direction from a boundary with the large-width portion. Then, it has a minimum width at a front end face of the magnetic pole for generating a perpendicular magnetic field. Thus, the magnetic flux supplied from the large-width portion can be concentrated at the magnetic pole end face located at the tip of the small-width portion, increasing the strength of a magnetic field to be emitted.

The recording magnetic pole film can produce a perpendicular recording magnetic field. In this case, preferably, the front end face which becomes a magnetic flux emitting surface has an inverted triangle shape without having the first portion. This is because the side-erasing preventing effect owing to the bevel angle BA can be effectively exerted.

When producing a perpendicular recording magnetic field, the recording magnetic pole film should be covered with a side shield film at both side faces. In this case, a non-magnetic insulating film can be interposed between the recording magnetic pole film and the side shield film.

In accordance with a typical structure of thin-film magnetic heads, the thin-film magnetic head according to the present invention may further comprise a reproducing element. Preferably, the reproducing element includes a GMR element or a TMR element.

The thin-film head according to the present invention can be combined with a head support device to provide a magnetic head device, while the magnetic head device can be combined with a magnetic recording medium to provide a magnetic recording/reproducing apparatus (HDD).

To manufacture the thin-film magnetic head according to the present invention, an alkali soluble resin film and a photoresist film are applied in the named order on one side of a first support layer supported by the slider substrate. Then, a photolithography process is performed on the alkali soluble resin film and the photoresist film in a given pattern for the recording magnetic pole film, thereby forming, through exposure and developing, a cut-out pattern having a first portion having both side faces extending vertically with a thickness corresponding to a film thickness of the applied alkali soluble resin film and a second portion having both side faces continuous with the first portion and inclined in such a direction as to increase the width along a film thickness direction with a thickness corresponding to a film thickness of the applied photoresist film.

Next, the recording magnetic pole film is formed in the cut-out pattern, and then a second support layer is formed around the recording magnetic pole film after removal of the alkali soluble resin film and the photoresist film.

With the above manufacturing method, the thin-film magnetic head according to the present invention can be easily and reliably manufactured using the characteristics and film thickness of the alkali soluble resin film. Typically, the alkali soluble resin film is PMGI.

The other objects, constructions and advantages of the present invention will be further detailed below with reference to the attached drawings. However, the attached drawings show only illustrative examples.

BRIEF DESCRIPTION OF THE DRAWINGS

FIG. 5 is a drawing showing a part of the sectional view of FIG. 3 on an enlarged scale;

FIG. 6 is an enlarged sectional view taken along line 6-6 in FIG. 2;

FIG. 8 is a drawing showing a process after the process shown in FIG. 7;

FIG. 9 is a drawing showing a process after the process shown in FIG. 8;

FIG. 10 is a drawing showing a process after the process shown in FIG. 9;

FIG. 11 is a drawing showing a process after the process shown in FIG. 10;

FIG. 15 is a drawing showing a process after the process shown in FIG. 14;

FIG. 16 is a drawing showing a process after the process shown in FIG. 15;

FIG. 17 is a drawing showing a process of another thin-film magnetic head manufacturing method according to the present invention;

FIG. 18 is a drawing showing a process after the process shown in FIG. 17;

FIG. 19 is a drawing showing a process after the process shown in FIG. 18;

FIG. 20 is a drawing showing a process after the process shown in FIG. 19;

FIG. 21 is a drawing showing a process after the process shown in FIG. 20;

FIG. 22 is a drawing showing a process after the process shown in FIG. 21;

DESCRIPTION OF THE PREFERRED EMBODIMENTS

1. Thin-film Magnetic Head

FIGS. 1 to 6 show the external appearance of a thin-film magnetic head to be used in combination with a rapidly spinning magnetic recording medium such as a hard disk and its details. Thin-film magnetic heads of this type are generally called "floating-type".

At first, a common structure of thin-film magnetic heads will be described with reference to FIGS. 1 to 4. In the thin-film magnetic head, as shown in these figures, a thin-film element RW for performing both recording and reproducing processes is attached to one face of a slider substrate 1 comprising, for example, a non-magnetic insulating material such as AlTiC and having a generally rectangular prism structure. The slider substrate 1 has an air bearing surface 70 directly relating to floating characteristics, and the thin-film element RW is attached to a trailing-side end face that is perpendicular to the air bearing surface 70.

On the trailing-side end face, bumps 91 to 94 are provided for the thin-film element RW. In thin-film magnetic heads of this type, the thin-film element RW includes a recording element and a reproducing element, and usually, four bumps 91 to 94 are provided according to these elements.

Figure 1:
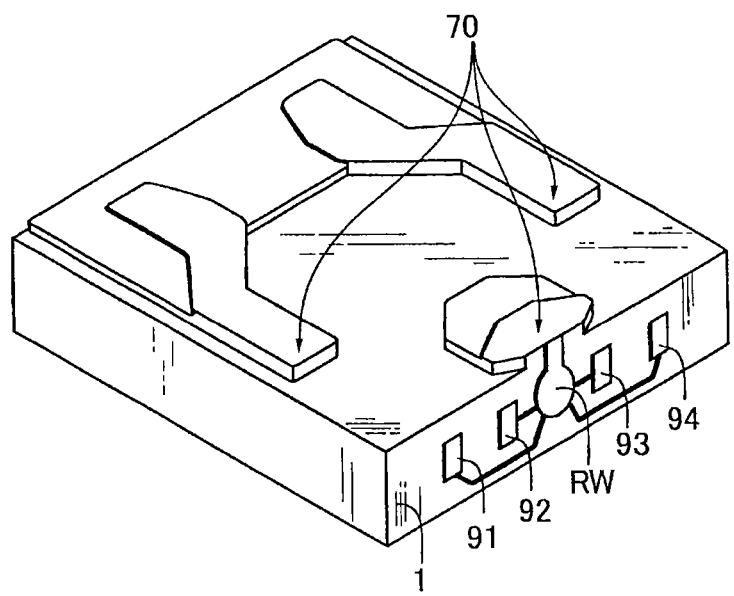
FIG. 1 is an external perspective view of a thin-film magnetic head according to the present invention.
Figure 2:
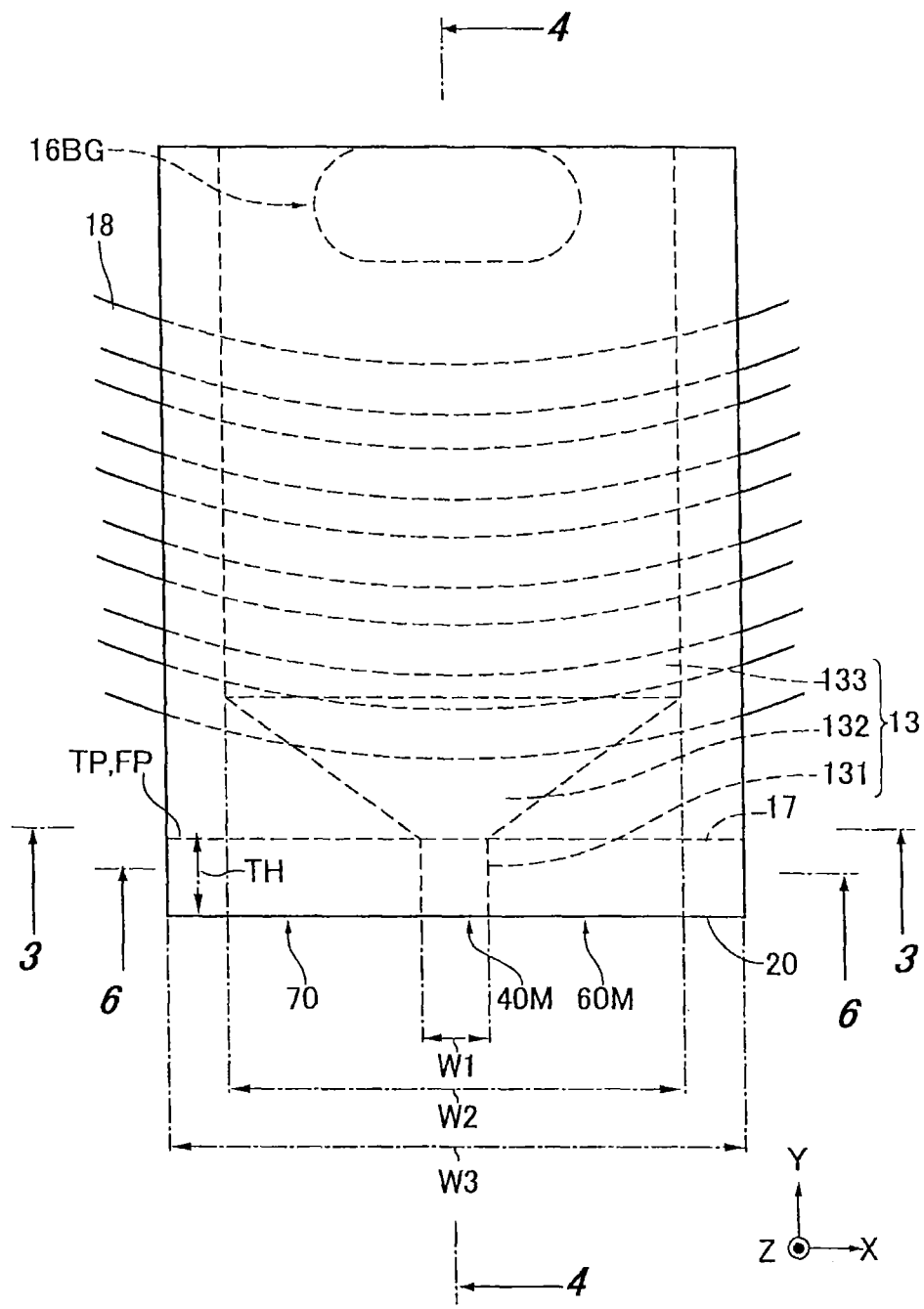
FIG. 2 is a plan view showing a part of a recording magnetic pole of the thin-film magnetic head of FIG. 1 on an enlarged scale.
Figure 3:
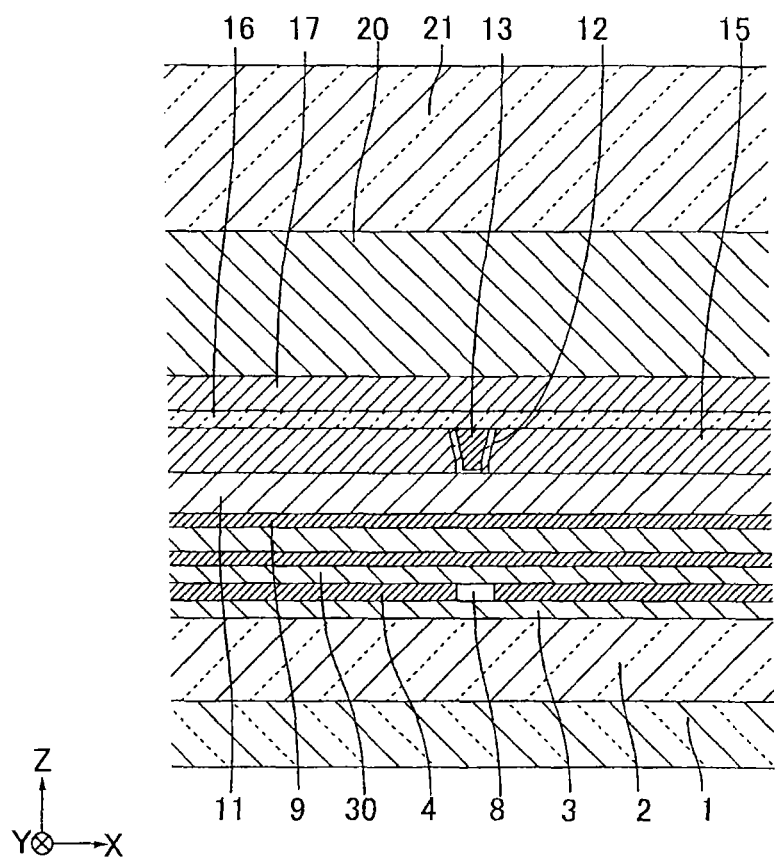
FIG. 3 is a sectional view taken along line 3-3 in FIG. 2.
Figure 4:
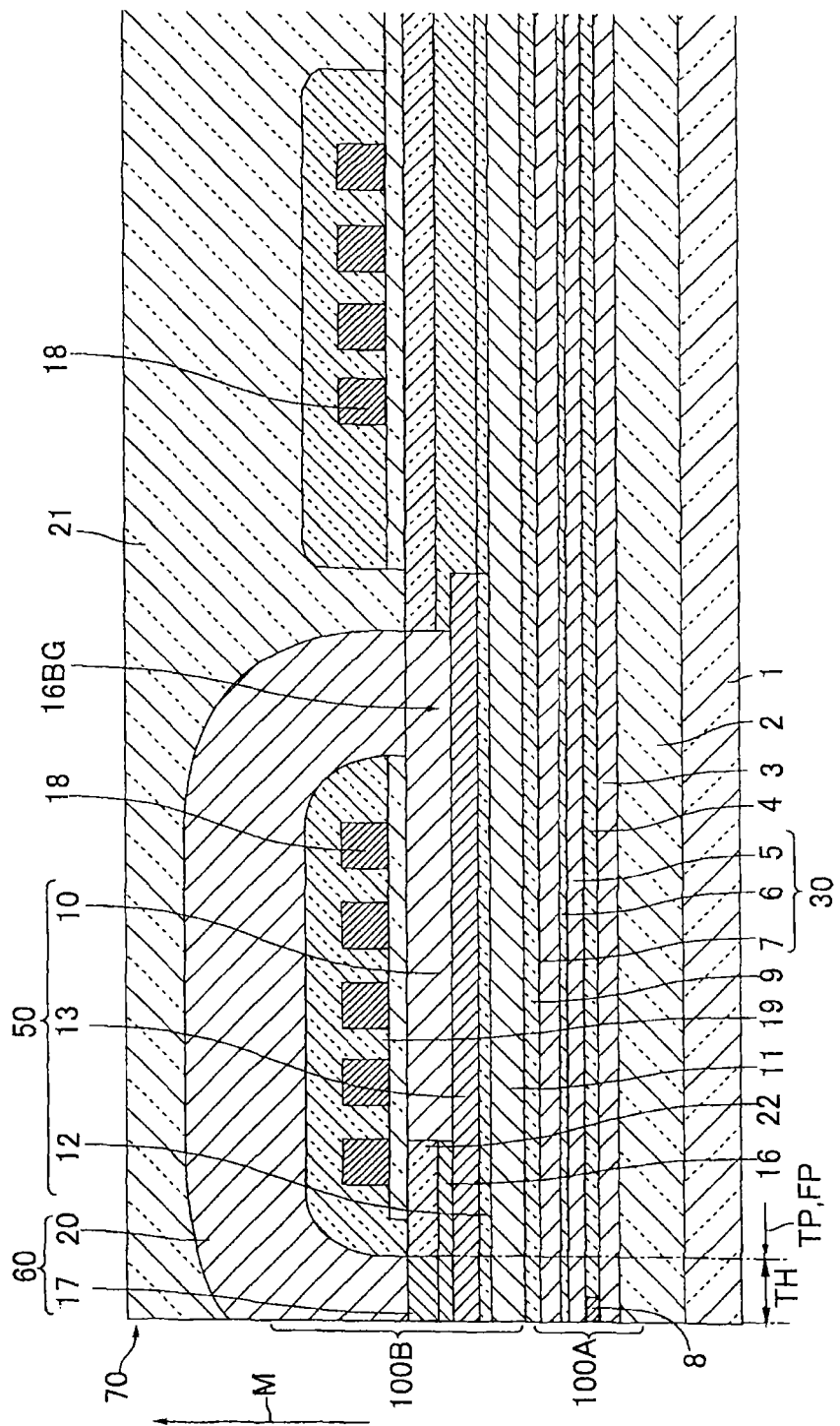
FIG. 4 is a sectional view taken along line 4-4 in FIG. 2.

Details of the thin-film element RW are shown in FIGS. 2 to 4. In FIGS. 2 to 4, dimensions along X, Y and Z axes are called "width", "length" and "thickness/height", respectively. Along the Y axis, moreover, one side close to the air bearing surface 70 and the other side remote therefrom are designated by "front" and "rear", respectively, and being positioned forward and being positioned rearward may be expressed by "project" and "recede", respectively.

The thin-film magnetic head is a complex-type head which can perform recording/reproducing of magnetic information in association with a magnetic recording medium (hard disk). In the thin-film magnetic head, an insulating layer 2, a reproducing head portion 100A for performing a reproducing process using magneto-resistive effect (MR effect), a separating layer 9, a recording head portion 100B for performing a recording process in a perpendicular recording method, and an overcoat layer 21 are stacked in the named order on the slider substrate 1 comprising, for example, a non-magnetic insulating material such as AlTiC.

The insulating layer 2, the separating layer 9 and the overcoat layer 21 comprise, for example, a non-magnetic insulating material such as aluminium oxide ($Al_2O_3$).

The reproducing head portion 100A is formed, for example, by stacking a lower read shield layer 3, a shield gap film 4, and an upper read shield layer 30 in the named order. In the shield gap film 4, a reproducing element 8 is embedded in such a manner as to be exposed on the air bearing surface 70 to be opposed to the recording medium.

Both the lower read shield layer 3 and the upper read shield layer 30 magnetically separate the MR element 8 from the surroundings and extend rearward from the air bearing surface 70. The lower read shield layer 3 comprises, for example, a magnetic material such as a nickel-iron alloy (NiFe (e.g., 80 wt. % of Ni and 20 wt. % of Fe): hereinafter merely referred to as "permalloy (trade name)"). The upper read shield layer 30 is formed, for example, by stacking two upper read shield layer portions 5, 7 with a non-magnetic film 6 interposed therebetween. Both the upper read shield layer portions 5, 7 comprise, for example, a magnetic material such as a permalloy. The non-magnetic film 6 comprises, for example, a non-magnetic material such as ruthenium (Ru) or alumina. The upper read shield layer 30 is not necessarily required to have a multilayer structure but may have a single-layer structure of a magnetic material.

The shield gap film 4 electrically separates the MR element 8 from the surroundings and comprises, for example, a non-magnetic insulating material such as alumina. The MR element 8 uses giant magneto-resistive effect (GMR) or tunneling magneto-resistive effect (TMR), for example.

The recording head portion 100B is, for example, a perpendicular magnetic recording head, i.e., a so-called shield-type head formed by stacking a magnetic pole film 50 embedded in a first support layer 11 and a second support layer 15, a gap film 16 having an opening (back gap 16BG) for magnetic connection, a thin-film coil 18 embedded in an insulating film 19, and a magnetic film 60 in the named order.

The magnetic pole film 50 leads a magnetic flux to the recording medium and, for example, extends rearward from the air bearing surface 70. The magnetic pole film 50 is formed, for example, by stacking an auxiliary magnetic pole film 10, a non-magnetic film 12 and a recording magnetic pole film 13 in the named order.

The auxiliary magnetic pole film 10, for example, extends from behind the air bearing surface 70 to the back gap 16BG. The auxiliary magnetic pole film 10 is, for example, disposed on the leading side with respect to the recording magnetic pole film 13 and has a rectangular plan shape (width W2), as shown in FIG. 2. The support layer 11 electrically and magnetically separates the auxiliary magnetic pole film 10 from the surroundings and comprises, for example, a non-magnetic insulating material such as alumina.

The non-magnetic film 12 is a first non-magnetic film electrically and magnetically separating the recording magnetic pole film 13 from the surroundings. The non-magnetic film 12, for example, extends from the air bearing surface 70 to the forefront position of the auxiliary magnetic pole film 10 for connecting the auxiliary magnetic pole film 10 and the recording magnetic pole film 13 to each other and comprises a non-magnetic insulating material such as alumina or aluminium nitride. However, the range over which the non-magnetic film 12 extends may be set arbitrarily. The section of the non-magnetic film 12 parallel to the air bearing surface 70 is U-shaped, and the recording magnetic pole film 13 is partially embedded in the non-magnetic film 12. Particularly, the non-magnetic film 12 includes a non-magnetic film formed by an ALD process, for example, and has a uniform thickness along the periphery (bottom face and both side faces) of the recording magnetic pole film 13.

The second support layer 15 is embedded outside the non-magnetic film 12 and comprises, for example, a non-magnetic insulating material such as alumina. In the case of employing a side-shield structure, alternatively, it may comprise a magnetic material.

The recording magnetic pole film 13 is a main magnetic flux-emitting portion and extends, for example, from the air bearing surface 70 to the back gap 16BG. As shown in FIG. 2, the recording magnetic pole film 13 includes small-width portions 131, 132 and a large-width portion 133 and has a table tennis racket-like plan shape as a whole. More specifically, it has a small-width portion composed of the first and second small-width portions 131, 132 and the large-width portion 133 in the named order from the air bearing surface 70. The first small-width portion 131 is a substantial magnetic flux-emitting portion and has a constant width W1 which defines a recording track width. The second small-width portion 132 is a portion from which a magnetic flux is supplied to the first small-width portion 131. The second small-width portion 132 is continuous, at its rear end, with the large-width portion 133 having a constant width (W2) and gradually narrows forward toward the first small-width portion 131. When the recording magnetic pole film 13 is seen from the air bearing surface 70, however, the second small-width portion 132 can be construed as a width-increasing portion. The position where the width of the recording magnetic pole film 13 starts to increase from W1 to W2 is a so-called flare point FP. The width W1 is equal to or less than about 0.2 µm.

Although not illustrated, the recording magnetic pole film 13 includes a seed layer and a plating layer formed on the seed layer. The seed layer is used to let the plating layer grow in a thin-film magnetic head manufacturing process and comprises, for example, a magnetic material similar to that of the plating layer. The plating layer comprises, for example, a magnetic material having a high saturation magnetic flux density such as a nickel-iron alloy (FeNi) or an iron-based alloy. Examples of the iron-based alloy include an iron-cobalt alloy (FeCo) and an iron-cobalt-nickel alloy (FeCoNi).

The gap film 16 is a gap for magnetically separating the recording magnetic pole film 13 from the magnetic film 60 and comprises, for example, a non-magnetic insulating material such as alumina or a non-magnetic conductive material such as ruthenium. The gap film 16 has a thickness of about 0.03 µm to 0.1 µm.

The thin-film coil 18 generates a magnetic flux and comprises, for example, a highly conductive material such as copper (Cu). The thin-film coil 18 is wound around the back gap 16BG to have a winding structure (or spiral structure).

The insulating film 19 electrically separates the thin-film coil 18 from the surroundings and comprises, for example, a non-magnetic insulating material such as a photoresist or a spin on glass (SOG) which becomes liquid when heated. The forefront position of the insulating film 19 is a throat height zero position TP, and the distance between the throat height zero position TP and the air bearing surface 70 is a so-called "throat height TH". For example, FIG. 2 shows a case where the throat height zero position TP matches the flare point FP.

The magnetic film 60 absorbs a spreading component of a magnetic flux emitted from the recording magnetic pole film 13 toward the recording medium so as to increase the gradient of the perpendicular magnetic field and also absorbs a magnetic flux after recording so as to circulate the magnetic flux between the recording head portion 100B and the recording medium. The magnetic film 60, which extends rearward from the air bearing surface 70 on the trailing side of the recording magnetic pole film 13, is separated from the recording magnetic pole film 13 by the gap film 16 at its front but connected to the recording magnetic pole film 13 through the back gap 16BG at its rear. On the side close to the air bearing surface 70, the magnetic film 60 has an end face 60M which is, for example, of a rectangular shape having a width W3 larger than the width W1, as shown in FIG. 3. The magnetic film 60 includes, for example, a write shield layer 17 and a return yoke layer 20 which are distinct from each other.

The write shield layer 17 mainly has a function of increasing the gradient of the perpendicular magnetic field and comprises, for example, a magnetic material having a high saturation magnetic flux density such as a permalloy or an iron-based alloy. Particularly by absorbing a spreading component of a magnetic flux emitted from the recording magnetic pole film 13, the write shield layer 17 (1) increases the magnetic field gradient of the perpendicular magnetic field, (2) decreases the recording width, and (3) incorporates an oblique magnetic field component into the perpendicular magnetic field. However, the write shield layer 17 may also have a function of circulating the magnetic flux like the return yoke layer 20. As shown in FIG. 3, for example, the write shield layer 17 is disposed adjacent to the gap film 16 and extends rearward from the air bearing surface 70 to have its rear end adjacent to the insulating film 19. Thus, the write shield layer 17 serves to define the forefront position (throat height zero position TP) of the insulating film 19.

The return yoke layer 20 has a function of circulating the magnetic flux and comprises, for example, a magnetic material similar to that of the write shield layer 17. The return yoke layer 20 extends from the air bearing surface 70, through above the insulating film 19, to the back gap 16BG on the trailing side of the write shield layer 17 and is connected to the write shield layer 17 at its front but connected to the recording magnetic pole film 13 at its rear through the back gap 16BG, as shown in FIG. 2.

The overcoat layer 21 protects the thin-film magnetic head and comprises, for example, a non-magnetic insulating material such as alumina.

What has been described above is a common structure of thin-film magnetic heads. The present invention is characterized in that the structure of the recording magnetic pole film 13 has been modified to improve writing performance of such a common thin-film magnetic head by suppressing magnetic saturation and unnecessary magnetic flux leakage while preventing side-erasing. The characteristic feature of the present invention will be described below with reference to FIGS. 5 and 6.

FIG. 5 shows the sectional view taken along line 3-3 in FIG. 2 on an enlarged scale, while FIG. 6 is a sectional view taken along line 6-6 in FIG. 2 or an end view at the air bearing surface 70. The recording magnetic pole film 13 has a large-width portion 133, a second small-width portion 132 and a first small-width portion 131 continuously arranged in the named order toward the air bearing surface 70, wherein the second small-width portion 132 and the first small-width portion 131 have a smaller width than the large-width portion 133. More specifically, the width of the second small-width portion 132 gradually decreases toward the first small-width portion 131 having the width W1 in a substantially laterally symmetrical manner from both lateral ends of the large-width portion 133 having the width W2. With this structure, a magnetic flux can be efficiently supplied from the large-width portion 133 to the first small-width portion 131 which serves as a recording magnetic pole.

Of the large-width portion 133, the first small-width portion 131 and the second small-width portion 132 constituting the recording magnetic pole film 13, at least the second small-width portion 132 has a first portion 134 having a thickness T1 and a second portion 135 having a thickness T2.

The first portion 134 extends upward from a bottom face adjacent to the first support layer 11, while the second portion 135 is continuous with an upper end of the first portion 134 and has both side faces inclined at an external angle $\omega 12$ in such a direction as to increase the width. An external angle $\omega 11$ of the first portion 134 formed by a plane parallel to the bottom face and the side face is larger than the external angle $\omega 12$ of the second portion 135 formed by a plane parallel to the bottom face and the side face.

In the prior art, the second portion 135 extends continuously to the bottom face at a constant external angle $\omega 12$, as indicated by line P1-R1 in FIG. 5. As compared with such a conventional structure, the sectional area of the first portion 134 increases by twice the rectangular area S1 defined by points P1, R1 and Q1, so that writing performance can be improved not only by reducing leakage of a magnetic flux supplied from the large-width portion 133 to the second small-width portion 132 but also by avoiding magnetic saturation at the second small-width portion 132. The external angle $\omega 11$ of the first portion 134 formed by a plane parallel to the bottom face and the side face is typically an angle at which the first portion 134 extends upward with a constant width, i.e., 90 degrees.

Referring next to FIG. 6 showing the end face of the first small-width portion 131 at the air bearing surface 70, the front end face of the first small-width portion 131 appearing at the tip of the recording magnetic pole film 13 has an inverted triangle shape having an external angle $\omega 2$. The external angle $\omega 2$ is a bevel angle that is relevant to magnetic recording, and "side-erasing", i.e., overwriting of adjacent tracks can be prevented because of the bevel angle $\omega 2$. Side-erasing depends on the shape of the magnetic pole end face, and an excellent side-erasing preventing effect can be expected in the embodiment in which it has an inverted triangle shape having a bevel angle $\omega 2$. Any section of the first small-width portion 131 taken parallel to the air bearing surface 70 has the inverted triangle shape shown in FIG. 6.

2. Method for Manufacturing Thin-film Magnetic Head

Next will be described a method for manufacturing the foregoing thin-film magnetic head. Basically, the thin-film magnetic head can be manufactured by forming and stacking a series of components in order using a conventional thin-film process including a film formation technique such as plating or sputtering, a patterning technique such as photolithography, an etching technique such as dry etching or wet etching, and a polishing technique such as chemical mechanical polishing (CMP).

Referring to FIGS. 2 to 4, the reproducing head portion 100A is formed such that at first, the insulating layer 2 is formed on the slider substrate 1, and then the lower read shield layer 3, the shield gap film 4 embedded with the MR element 8 and the upper read shield layer 30 (the upper read shield layer portions 5, 7 and the non-magnetic film 6) are stacked on the insulating layer 2 in the named order.

Then, the recording head portion 100B is formed such that after the insulating layer 9 is formed on the reproducing head portion 100A, the magnetic pole film 50 (the auxiliary magnetic pole film 10, the non-magnetic film 12 and the recording magnetic pole film 13) embedded in the support layers 11, 15, the gap film 16, the thin-film coil 18 embedded in the insulating film 19, and the magnetic film 60 (the write shield layer 17 and the return yoke layer 20) are stacked on the insulating layer 9 in the named order. Finally, after the overcoat layer 21 is formed on the recording head portion 100B, the thin-film magnetic head is completed by forming the air bearing surface 70 using a machining process or a polishing process.

Of the series of manufacturing processes, the manufacturing method according to the present invention has a distinctive feature in the process of manufacturing the recording magnetic pole film 13. A method for manufacturing the recording magnetic pole film 13 will be described with reference to FIGS. 7 to 22. All manufacturing processes illustrated in these figures are conducted on a wafer.

Figure 7:
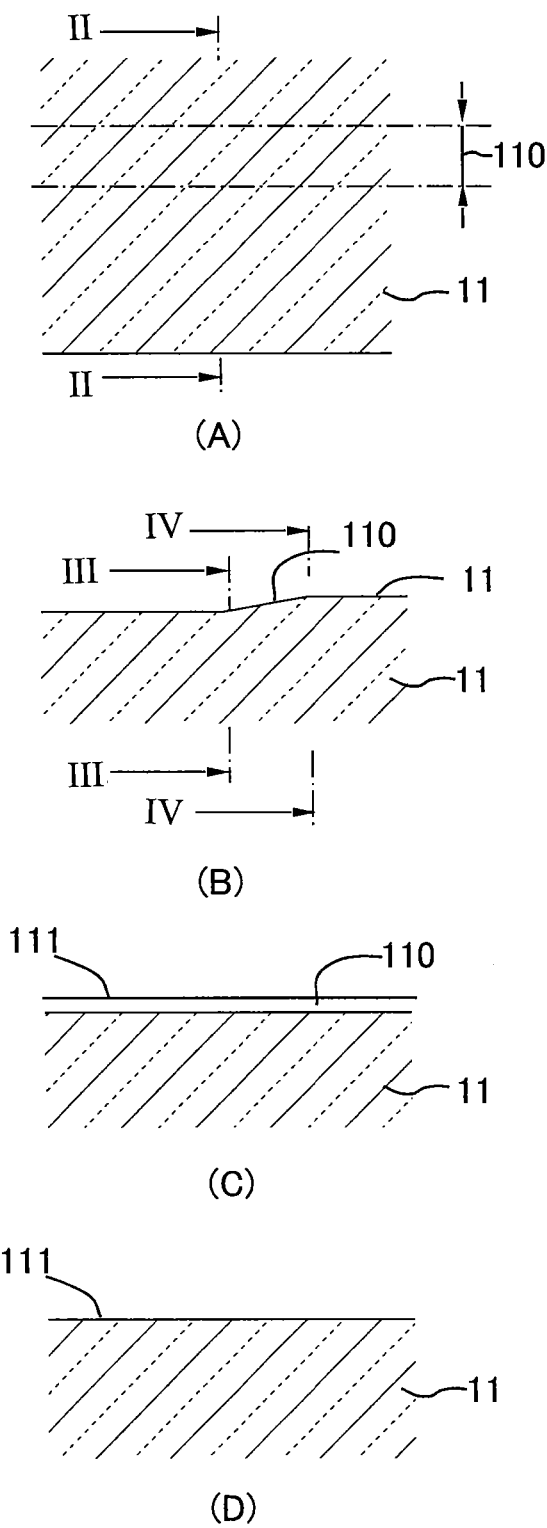
FIG. 7 is a drawing showing a process of a thin-film magnetic head manufacturing method according to the present invention.

Prior to detailed description, individual views and their positional relationships in FIGS. 7 to 22 will be explained below. In FIG. 7, at first, FIG. 7(A) is a plan view showing a part of a wafer after formation of the first support layer 11, FIG. 7(B) is a sectional view taken in the direction of arrows of line II-II in FIG. 7(A), FIG. 7(C) is a sectional view taken in the direction of arrows of line III-III in FIG. 7(B) and FIG. 7(D) is a sectional view taken in the direction of arrows of line IV-IV in FIG. 7(B). FIGS. 8 to 22 have similar views and positional relationships. In FIGS. 8 to 22, accordingly, FIGS. 8(A) to 22(A) are plan views, FIGS. 8(B) to 22(B) are sectional views taken in the direction of arrows of line B-B in FIGS. 8(A) to 22(A), FIGS. 8(C) to 22(C) are sectional views taken in the direction of arrows of line C-C in FIGS. 8(B) to 22(B) and FIGS. 8(D) to 22(D) are sectional views taken in the direction of arrows of line D-D in FIGS. 8(B) to 22(B), and they are in agreement with the positions shown in FIGS. 7(A) and 7(B).

At first, as shown in FIGS. 7(A) to 7(D), a support layer 11 is formed on a slider substrate. The air bearing side is directed to a lower side in FIG. 7(A) and to a right side in FIG. 7(B). In the present embodiment, the support layer 11 has an incline surface 110 uprising toward the air bearing side and a higher level surface 111 beyond that.

Then, as shown in FIGS. 8(A) to 8(D), an alkali soluble resin film RS1 is applied to one side of the first support layer 11 by a spin-coating process or the like to have a film thickness of 100 to 800 angstroms. Typically, the alkali soluble resin film RS1 is PMGI (polydimethyl glutarimide).

Then, as shown in FIGS. 9(A) to 9(D), a photoresist film RS2 is applied onto the alkali soluble resin film RS1 by a spin-coating process or the like.

Then, the photoresist film RS2 is exposed to light using a mask having a pattern of the recording magnetic pole film and developed by an alkali developer. Accordingly, as shown in FIGS. 10(A) to 10(D), a cut-out pattern is formed in accordance with the pattern of the recording magnetic pole film. A mask frame defining the cut-out pattern has a structure in which the alkali soluble resin film RS1 is a lower layer and the photoresist film RS2 is laid thereon. In this case, as shown in FIGS. 10(C) and 10(D), the inner wall surface of the photoresist film RS2 is inclined at a certain inclination angle, but the alkali soluble resin film RS1 of PMGI is developed such that its inner wall surface extends substantially vertically. The cut-out pattern has a relatively large width at a portion corresponding to the second small-width portion, as shown in FIG. 10(C), but has a relatively small width at the first small-width portion which becomes a magnetic pole, as shown in FIG. 10(D). Particularly at the bottom side, it has a considerably small width.

Then, by means of sputtering or the like, a non-magnetic film 12 is formed on the top face and the inner side face of the photoresist film RS2 and on the top face of the first support layer 11 exposed within the cut-out pattern, as shown in FIG. 11. In the course of formation of the non-magnetic film 12, the bottom of the cut-out pattern is filled with the deposited non-magnetic film 12 at a portion corresponding to the first small-width portion in which the cut-out pattern has a small width, whereby the cut-out pattern has an inverted triangular shape, as shown in FIG. 11(D). In this figure, the non-magnetic film 12 has a simple single-layer film structure, but may have a structure in which different materials are stacked using different deposition processes.

Figure 12:
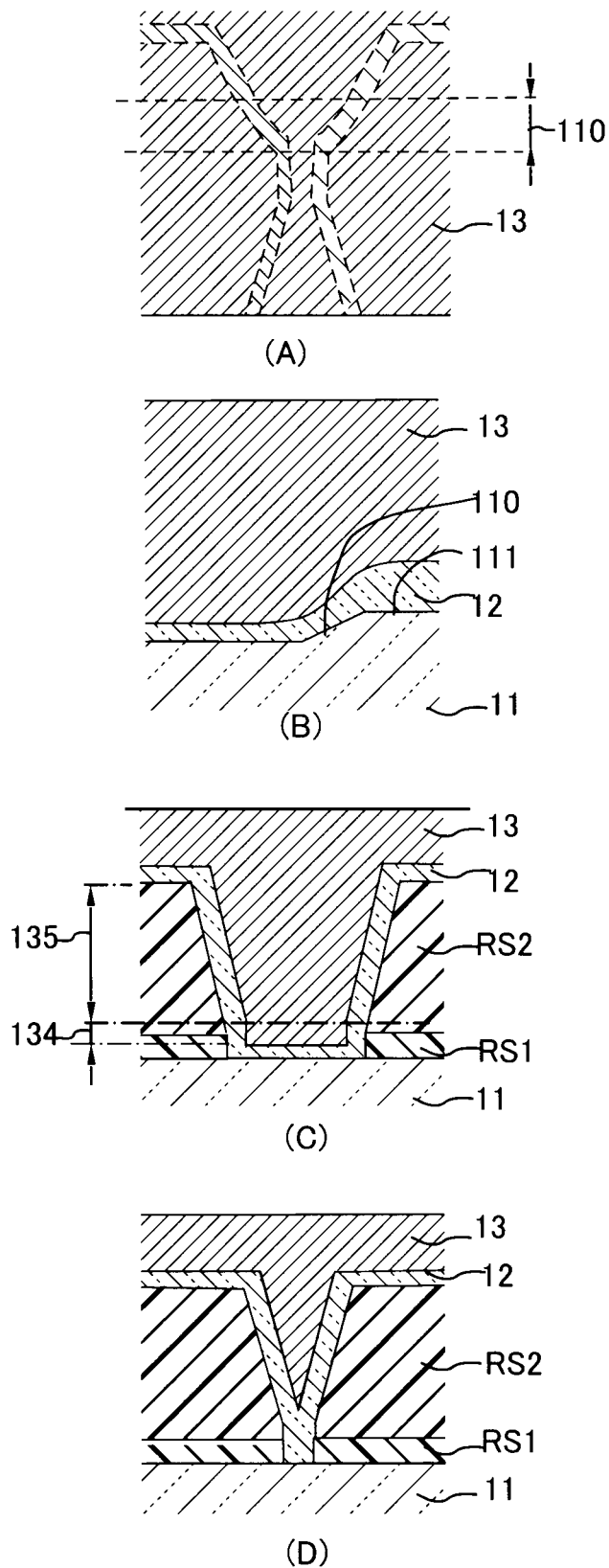
FIG. 12 is a drawing showing a process after the process shown in FIG. 11.

Then, as shown in FIG. 12, a magnetic film 13 which becomes a recording magnetic pole film is formed by plating. Within the cut-out pattern at the portion corresponding to the second small-width portion, the magnetic film 13 has a first portion 134 having a thickness of T1 and a second portion 135 having a thickness of T2, as shown in FIG. 12(C). The first portion 134 extends upward from a bottom face adjacent to the first support layer 11, while the second portion 135 is continuous with the upper end of the first portion 134 and has both side faces inclined in such a direction as to increase the width. The external angle of the first portion 134 formed by a plane parallel to the bottom face and the side face is set at an angle larger than the external angle of the second portion 135 formed by a plane parallel to the bottom face and the side face, e.g., 90 degrees. Within the cut-out pattern at the portion corresponding to the first small-width portion which becomes a magnetic pole, the magnetic film 13 has an inverted triangular section without having the first portion, as shown in FIG. 12(D).

Figure 13:
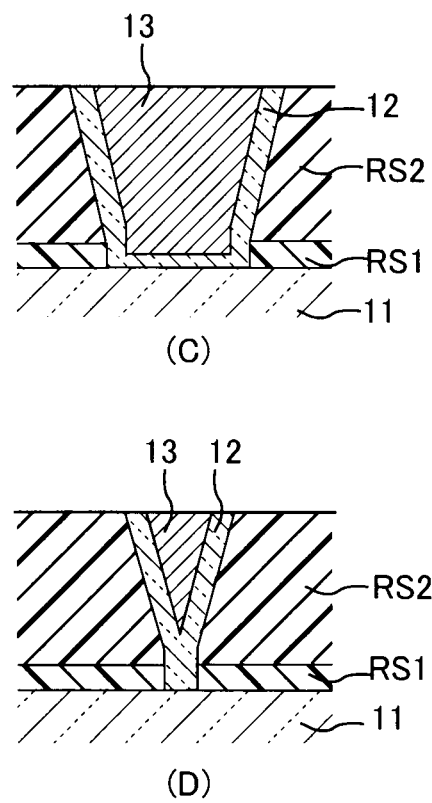
FIG. 13 is a drawing showing a process after the process shown in FIG. 12.
Figure 14:
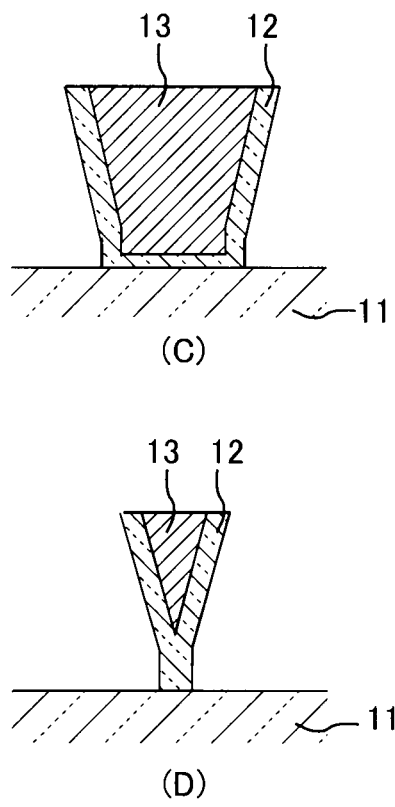
FIG. 14 is a drawing showing a process after the process shown in FIG. 13.

Then, the photoresist film RS2 is exposed by milling or the like, as shown in FIG. 13, and thereafter, the alkali soluble resin film RS1 and the photoresist film RS2 are removed, as shown in FIG. 14. The PMGI of the alkali soluble resin film RS1 can be peeled off by a photoresist stripper.

Next, a second support layer 15 is formed by sputtering or the like, as shown in FIG. 15, and then, the surface of the second support layer 15 is flattened by CMP or the like, as shown in FIG. 16. Thereafter, well-known processes are further performed to produce the thin-film magnetic head shown in FIGS. 1 to 6.

FIGS. 17 to 22 illustrate another method for manufacturing the thin-film magnetic head according to the present invention. Individual views of FIGS. 17 to 22 are shown in the same manner as those of FIGS. 7 to 16. The difference from the embodiment shown in FIGS. 7 to 16 resides in that the first support layer 11 in FIGS. 17 to 22 has a flat surface and does not have an inclined surface (110) which causes a difference in level, as clearly seen from FIG. 17. In the flat surface, the alkali soluble resin film RS1 is applied to one side of the first support layer 11 (see FIG. 18), the photoresist film RS2 is then applied onto the alkali soluble resin film RS1 (see FIG. 19), and the photoresist film RS2 is exposed to light and developed by an alkali developer (see FIG. 20).

Then, by means of sputtering or the like, the non-magnetic film 12 is formed on the top face and the inner side face of the photoresist film RS2 and on the top face of the first support layer 11 exposed within the cut-out pattern, as shown in FIG. 21. In this process, the inclined surface (110) which causes a difference in level between the first small-width portion and the second small-width portion is formed by the non-magnetic film 12.

Then, after the magnetic film 13 is formed by plating, as shown in FIG. 22, the photoresist film RS2 is exposed by milling or the like, as shown in FIG. 13, the surface of the magnetic film 13 is flattened, the alkali soluble resin film RS1 and the photoresist film RS2 are removed, as shown in FIG. 14, the second support layer 15 is formed, as shown in FIG. 15, the surface of the second support layer 15 is flattened, as shown in FIG. 16, and well-known processes are further performed to produce the thin-film magnetic head shown in FIGS. 1 to 6.

3. Head Assembly

The present invention further discloses a head assembly. The head assembly includes the foregoing thin-film magnetic head and a head support device. The head support device supports the thin-film magnetic head in such a manner as to permit rolling and pitching of the thin-film magnetic head. In the present invention, examples of the head assembly include an HGA (head gimbal assembly) in which the thin-film magnetic head is mounted on a head support device (gimbal) and an HAA (head arm assembly) in which the HGA is mounted on an arm.

Figure 23:
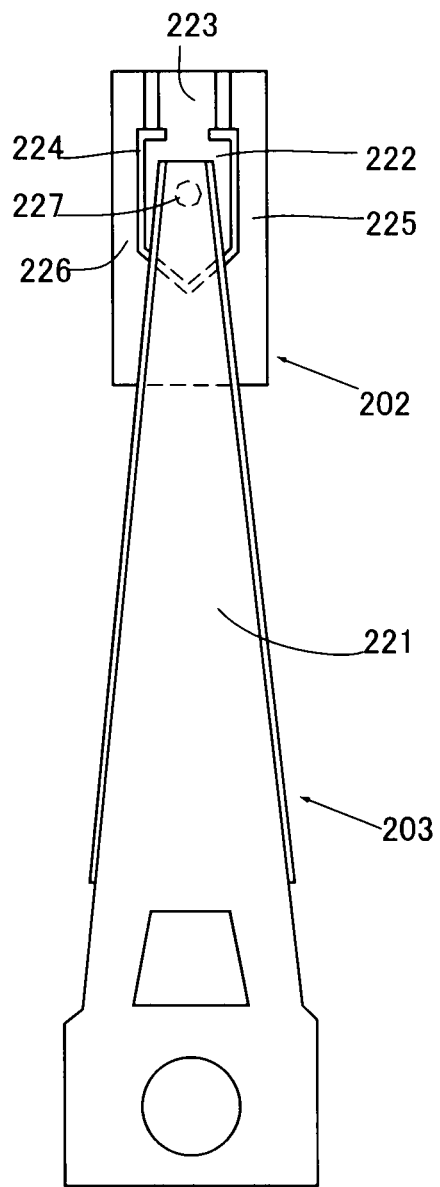
FIG. 23 is a drawing showing a magnetic head device according to the present invention.
Figure 24:
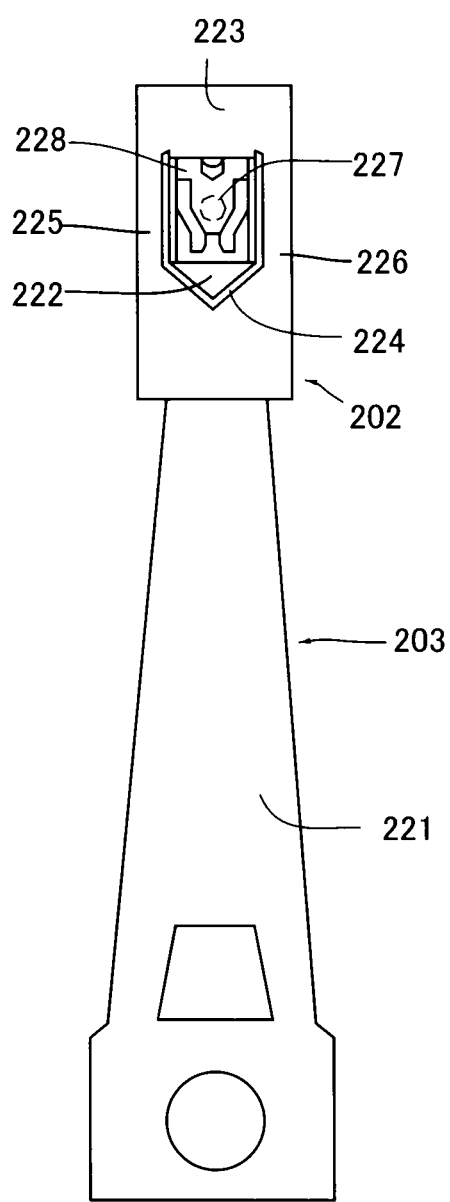
FIG. 24 is a bottom view of the magnetic head device shown in FIG. 23.

FIG. 23 is a front view of a head assembly according to the present invention, and FIG. 24 is a bottom view of the head assembly shown in FIG. 23. The illustrated head assembly is an HGA including a suspension 203 and a thin-film magnetic head 228. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The thin-film magnetic head 228 is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The thin-film magnetic head 228 is attached to one side of the tongue portion 222 by means of an adhesive or the like, which is kept in spring contact with the tip of the load dimple 227.

One face of the thin-film magnetic head 228 opposite from the air bearing surface 70 of the slider is attached to the tongue portion 222 of the suspension 203. Flexible leads and so on not shown in the drawings are connected to the thin-film magnetic head 228.

Figure 25:
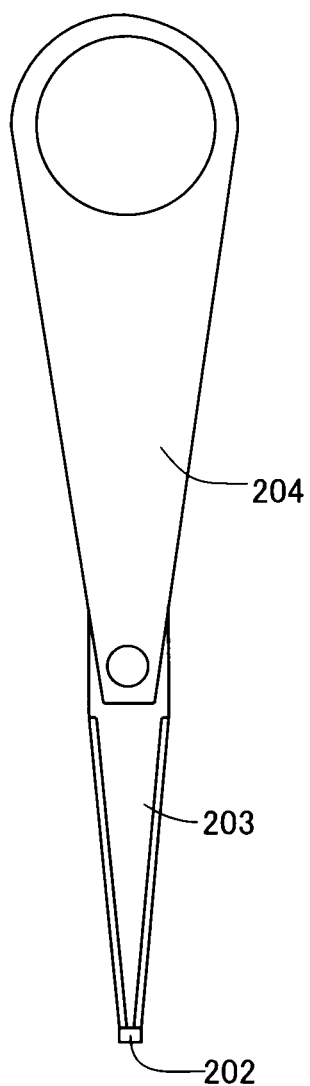
FIG. 25 is a drawing showing another magnetic head device according to the present invention.

FIG. 25 is a front view of an HAA. The illustrated HAA includes the suspension 203, the thin-film magnetic head 228 and an arm 204. The arm 204 is integrally formed from a suitable non-magnetic metallic material such as aluminum alloy. The arm 204 is provided with a mounting hole. The mounting hole is used for mounting on a positioning device provided in a magnetic disk apparatus. One end of the suspension 203 is secured to the arm 204, for example, with a ball connecting structure.

4. Magnetic Recording/Reproducing Apparatus

Figure 26:
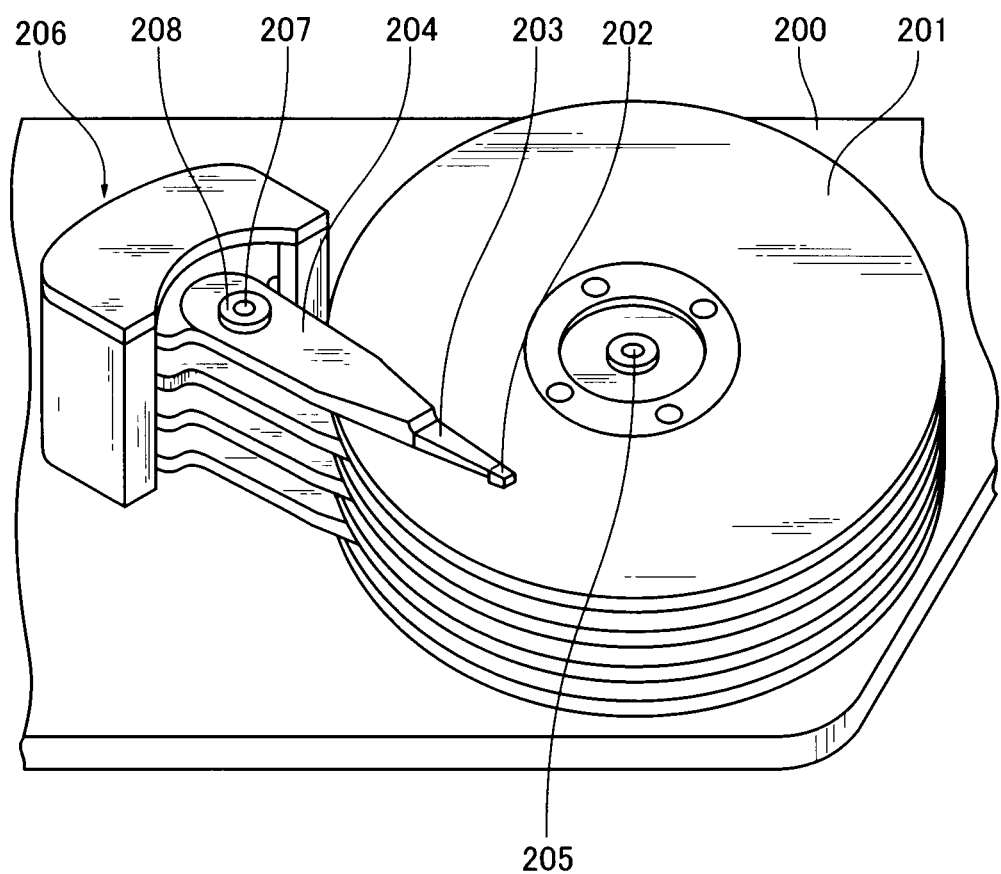
FIG. 26 is a drawing a magnetic recording/reproducing apparatus according to the present invention.

Next will be described a structure of a magnetic recording/reproducing apparatus equipped with the thin-film magnetic head according to the present invention. FIG. 26 shows the structure of the magnetic recording/reproducing apparatus. The magnetic recording/reproducing apparatus is, for example, a hard disk drive equipped with the foregoing thin-film magnetic head.

As shown in FIG. 26, the magnetic recording/reproducing apparatus includes, within a case 200, magnetic disks (e.g., hard disks) 201, a plurality of suspensions 203 disposed for the magnetic disks 201 and supporting the thin-film magnetic head at their one end, and a plurality of arms 204 supporting the other end of the suspensions 203. The magnetic disks 201 are rotatable about a spindle motor which is fixed to the case 200. The arms 204 are connected to an actuator 206 being a power source and are pivotable through a bearing 208 about a fixed shaft 207 which is fixed to the case 200.

The actuator 206 is constructed to include, for example, a driving source such as a voice coil motor. This magnetic recording/reproducing apparatus is of the type having a plurality of arms 204 integrally pivotable about the fixed shaft 207, for example. In FIG. 26, the case 200 is shown in a partially cut-away state, making it easy to see the internal structure of the magnetic recording/reproducing apparatus.

A thin-film magnetic head is the thin-film magnetic head according to the present invention. When the magnetic disk 201 rotates for recording or reproducing of information, the thin-film magnetic head takes off from a recording surface of the magnetic disk 201 utilizing an airflow generated between the recording surface (thin-film magnetic head-facing surface) of the magnetic disk 201 and the air bearing surface 70, and performs magnetic recording or reproducing.

Then, since the thin-film magnetic head used in the magnetic recording/reproducing apparatus is the thin-film magnetic head according to the present invention, writing performance can be improved by suppressing magnetic saturation and unnecessary magnetic flux leakage while preventing side-erasing.

The present invention has been described in detail above with reference to preferred embodiments. However, obviously those skilled in the art could easily devise various modifications of the invention based on the technical concepts underlying the invention and teachings disclosed herein.

What is claimed is:

1. A thin-film magnetic head comprising a slider substrate and a write element,
   the slider substrate having an air bearing surface at one side thereof,
   the write element having a recording magnetic pole film,
   the recording magnetic pole film being disposed on a plane crossing the air bearing surface over the slider substrate and having a large-width portion and a small-width portion continuously arranged in the named order toward the air bearing surface, the air bearing surface being parallel to an XZ plane of an XYZ orthogonal coordinate system with an X axis direction being a track width direction, wherein
   the small-width portion
      has a smaller width than the large-width portion, the width being measured in the X axis direction, and
      has a second small-width portion whose width in the X axis direction gradually decreases along a Y axis direction of the XYZ orthogonal coordinate system from a boundary with the large-width portion and a first small-width portion continuous with the second small-width portion along the Y axis direction,
   the second small-width portion has a first portion and a second portion,
   the first portion extends in a Z axis direction of the XYZ orthogonal coordinate system,
   the second portion is continuous with an upper end of the first portion and has both side faces inclined in such a direction as to increase a width of the second portion in the X axis direction toward an upper end of the second portion, the upper end of the first portion and the upper end of the second portion located in the Z axis direction opposite to a direction in which the slider substrate is located,
   an external angle of the first portion formed by a plane parallel to a bottom face of the first portion and a side face of the first portion is larger than an external angle of the second portion formed by a plane parallel to a bottom face of the second portion and a side face among the both side faces of the second portion, the side face of the first portion and the side face of the second portion extending in the Y axis direction, the bottom face of the first portion located in an opposite direction in which the upper end of the first portion is located, and the bottom face of the second portion located in an opposite direction in which the upper end of the second portion is located, and an end face of the first small-width portion at the air bearing surface side has a triangle shape.

2. The thin-film magnetic head of claim 1, wherein the first portion extends in the Z axis direction with a constant width in the X axis direction.

3. The thin-film magnetic head of claim 1, wherein width of the first small-width portion in the X axis direction is constant.

4. The thin-film magnetic head of claim 1, wherein a bottom face of the first small-width portion is located at an upper location as compared to a bottom face of the second small-width portion in the Z axis direction.

5. The thin-film magnetic head of claim 1, wherein the recording magnetic pole film produces a perpendicular recording magnetic field.

6. The thin-film magnetic head of claim 1, further comprising a reproducing element, the reproducing element being disposed at the slider substrate.

7. The thin-film magnetic head of claim 6, wherein the reproducing element includes a GMR element or a TMR element.

8. A thin-film magnetic head device comprising a thin-film magnetic head and a head support device, wherein the thin-film magnetic head is that claimed in claim 1, and the head support device supports the thin-film magnetic head.

9. The thin-film magnetic head device of claim 8, wherein the first portion extends in the Z axis direction upward with a constant width in the X axis direction.

10. A magnetic recording/reproducing apparatus comprising a thin-film magnetic head device and a magnetic recording medium, wherein the thin-film magnetic head device is that claimed in claim 8, and the magnetic recording/reproducing apparatus performs magnetic recording and reproducing in association with the magnetic recording medium.

* * * * *